(No Model.)

H. B. COX.
GALVANIC BATTERY.

No. 372,658. Patented Nov. 8, 1887.

Witnesses
Harry S. Rohrer
Charles M. Werts

Inventor
Harry B. Cox
By his Attorney
O. E. Duff

UNITED STATES PATENT OFFICE.

HARRY B. COX, OF CINCINNATI, OHIO.

GALVANIC BATTERY.

SPECIFICATION forming part of Letters Patent No. 372,658, dated November 8, 1887.

Application filed May 5, 1887. Serial No. 237,255. (No model.)

*To all whom it may concern:*

Be it known that I, HARRY B. COX, of Cincinnati, in the county of Hamilton and State of Ohio, have invented certain new and useful Improvements in Electric Batteries; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an electrical battery, and has for its object, first, to prevent the spilling or escape of the excitant; second, to maintain the elements and electrodes normally in place; third, to keep the carbon exposed and permit it to breathe, and, fourth, to provide a sealing compound which will not crack or melt at out-of-door temperatures, will cling closely to the sides of the containing-vessel, and will have good insulating and moisture-resisting qualities.

With these ends in view my invention consists in certain details of construction, which will be hereinafter explained and claimed, whereby a portable voltaic battery simple in construction and economical in first cost is provided.

Figure 1:
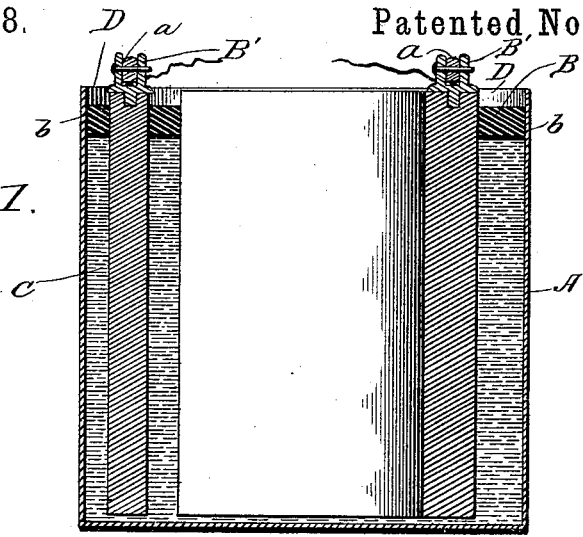
Figure 2:
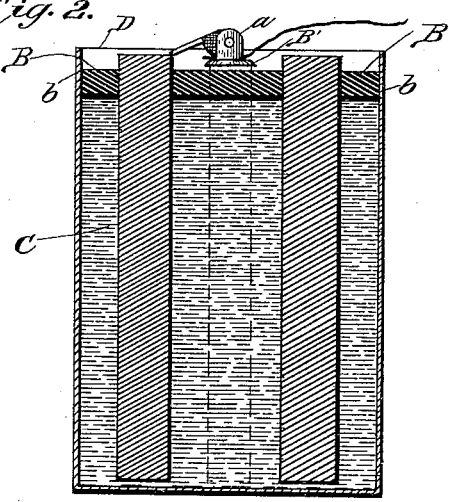
Figure 3:
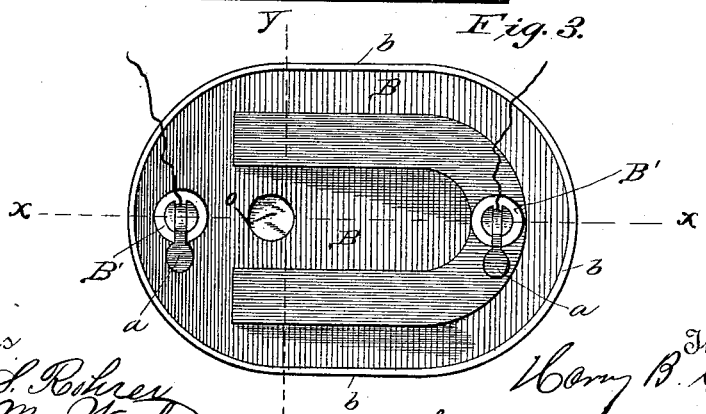

Referring to the accompanying drawings, Figure 1 is a central longitudinal section on line $x$ $x$, Fig. 3. Fig. 2 is a transverse sectional view on line $y$ $y$, Fig. 3. Fig. 3 is a top plan view.

Like letters of reference mark the same parts in all the figures of the drawings.

Referring to the drawings by letters, A represents a suitable battery having exciting-fluid, (preferably gelatine,) positive and negative zinc and carbon plates, and the poles B′ B′, provided with binding-posts $a$ $a$, as shown.

B represents a surface layer of a sealing-mixture placed in between the sides $b$ $b$ of battery, and consisting, preferably, of a substance composed of asphaltum, three parts, and rosin, one part.

The proportions may be varied considerably without departing from the spirit of my invention, and it will be understood that definite proportions are not necessary to a successful result. The asphaltum may be first heated and the rosin then stirred in or poured in melted, or both may be heated together. The mass has a low specific gravity, and may be poured directly on the battery-excitant around the upper ends of the electrodes. A core is inserted in the mass until it sets, when the core is removed, leaving a vent, O, Figs. 2 and 3, for the gases developed by the action of the battery.

This sealing compound is intended for use in connection with my paste electrolytes described in Patent No. 350,294, granted to me October 5, 1886, and in application No. 237,256, filed May 5, 1887; but it may be used equally well with any other electrolyte, suitable provision being made for supporting it while hot if the excitant should not be of greater specific gravity. The compound resists cracking and adheres closely to the containing-vessel—two desiderata which are not supplied by any sealing compound now in use— and will require a high temperature to melt it, whereas the compound now in use softens at low temperatures, and the batteries cannot be used when they will be subjected to much heat. I find, also, that with other compounds changes of temperature or the contraction of cooling after the sealing operation leaves a narrow space between the containing-vessel and the periphery of the sealing mass. However narrow this space, the salts of the battery will "creep" through, rendering the cell unclean and reducing its certainty and evenness of action from evaporation of its electrolyte. With the compound I have described, however, the material adheres to the sides of the vessel—which in my battery is of glass—and makes a close sealing.

In Figs. 1 and 2 the sealing substance B is on the surface of the gelatine, C, yet sufficiently below the top D of the battery to expose the carbon binding-posts $a$ $a$.

Having thus fully described my invention, what I claim, and desire to secure by Letters Patent of the United States, is—

1. A galvanic battery consisting of a cell having suitable excitant and elements or electrodes, and provided with a sealing compound of asphaltum and rosin on top of the excitant, substantially as described.

2. A portable voltaic cell having a sealing compound consisting of asphaltum and rosin run in on top of excitant below the top of the carbon and binding-posts, as set forth.

3. A sealing compound for batteries, consisting of asphaltum and rosin, substantially as specified.

In testimony that I claim the foregoing as my own I affix my signature in presence of two witnesses.

HARRY B. COX.

Witnesses:
CHARLES M. WERLE,
O. E. DUFFY.